(12) United States Patent
Berg et al.

(10) Patent No.: US 6,779,101 B1
(45) Date of Patent: Aug. 17, 2004

(54) METHOD AND APPARATUS FOR PROCESSING COMPRESSED VLIW SUBINSTRUCTION OPCODES

(75) Inventors: Stefan G. Berg, Seattle, WA (US); Donglok Kim, Seattle, WA (US); Yongmin Kim, Seattle, WA (US)

(73) Assignee: University of Washington, Seattle, WA (US)

(*) Notice: Subject to any disclaimer, the term of this patent is extended or adjusted under 35 U.S.C. 154(b) by 0 days.

(21) Appl. No.: 09/520,754

(22) Filed: Mar. 7, 2000

(51) Int. Cl.[7] ............................ G06F 15/00; H03M 7/00
(52) U.S. Cl. ...................... 712/24; 712/200; 341/106
(58) Field of Search ................................ 712/200, 208, 712/210, 24; 341/106, 65

(56) References Cited

U.S. PATENT DOCUMENTS

| | | | | |
|---|---|---|---|---|
| 4,745,605 A | * | 5/1988 | Goldman et al. | 714/801 |
| 5,463,746 A | * | 10/1995 | Brodnax et al. | 712/240 |
| 5,636,352 A | | 6/1997 | Bealkowski et al. | |
| 5,652,852 A | * | 7/1997 | Yokota | 712/208 |
| 5,895,469 A | * | 4/1999 | Lahti et al. | 710/52 |
| 6,044,450 A | * | 3/2000 | Tsushima et al. | 712/24 |
| 6,233,674 B1 | * | 5/2001 | Elnozahy | 712/227 |
| 6,263,429 B1 | * | 7/2001 | Siska | 712/245 |

OTHER PUBLICATIONS

Ernst et al., Code Compression, Proceedings of the 1997 ACM SIGPLAN conference on Programming language design and implementation, May 1997, vol. 32 Issue 5.*
Basu, D., Text Compression Using Several Huffman Trees, Data Compression Conference, 1991, p. 452.*
P. Bird et al., An Instruction Stream Compression Technique, University of Michigan, Nov. 1996, pp. 1–21.*
D. Kirovski, Procedure Based Program Compression, University of California at Los Angeles, 1997, pp. 204–213.*
C. Lefurgy et al., Code Compression for DSP, University of Michigan, Dec. 1998, pp. 1–5.*
C. Lefurgy et al., Improving Code Density Using Compression Techniques, University of Michigan, 1997, pp. 194–203.*
Araujo et al., "Code Compression Based on Operand Factorization," 1998.*
"Numerical Recipes in C: The Art of Scientific Computing," 1988–1992, pp.903–910.*
Lekatsas et al., "Code Compression for Embedded Systems," 1998, pp. 516–521.*
Nam et al., "Improving Dictionary–Based Code Compression in VLIW Architectures," 1999, pp.2318–2323.*
Maynard et al., "Contrasting Characteristics and Cache Performance of Technical and Multi–User Commercial Workloads," Proceeedings of the 6th Annual Int'l Conf on Architectural Support for Programming Lang and OS; 10/94.
Berg et al.; "Critical Review of Programmable Architectures," SPIE Proceedings, vol. 3655 pp 147–156, 1999, Mediaprocessor.
Allan et al., "Software Pipelining," ACM Computing Journal, vol. 27, pp 367–432, 1995.

* cited by examiner

Primary Examiner—Eddie Chan
Assistant Examiner—David J. Huisman
(74) Attorney, Agent, or Firm—Steven P. Koda

(57) ABSTRACT

An area of on-chip memory is allocated to store one or more tables of commonly-used opcodes. The normal opcode in the instruction is replaced with a shorter code identifying an index into the table. As a result, the instruction is compressed. For a VLIW architecture, in which an instruction includes multiple subinstructions (multiple opcodes), the instruction loading bandwidth is substantially reduced. Preferably, an opcode table is dynamically loaded. Different tasks are programmed with a respective table of opcodes to be stored in the opcode table. The respective table is loaded when task switching. A smaller, dynamic opcode table provides an effective selection and a low table loading overhead

11 Claims, 5 Drawing Sheets

METHOD AND APPARATUS FOR PROCESSING COMPRESSED VLIW SUBINSTRUCTION OPCODES

CROSS REFERENCE TO RELATED APPLICATIONS

This invention is related to U.S. patent application Ser. No. 09/519,695 filed Mar. 7, 2000 naming Kim et al. titled, "Method and Apparatus for Compressing VLIW Instruction and Sharing Subinstructions." The content of such application is incorporated herein by reference and made a part hereof.

BACKGROUND OF THE INVENTION

This invention relates to methods and apparatus for compressing processor instructions, and more particularly to a method and apparatus for compressing the opcode portion of instructions.

In the conventional efforts for optimizing processing efficiency, the data bandwidth has been addressed more often than the instruction bandwidth. This emphasis seems justified, for example, based on benchmark programs which typically show much smaller instruction cache miss rates than data cache miss rates. Such results indicate that off-chip instruction bandwidth requirements are much smaller than data bandwidth requirements. However, for some commercial workloads, such as image processing, data cache miss rates are typically lower than instruction cache miss rates. Accordingly, there is an increasing need to optimize instruction bandwidth.

Two recent trends are increasing the instruction bandwidth, and correspondingly, the need for a larger instruction cache size. The first trend is that very long instruction word (VLIW) architectures are becoming popular in many high-performance processor architectures. A VLIW architecture executes a large number of operations per cycle by taking advantage of its wide instruction bits. This directly translates into significantly increased instruction bandwidth compared to superscalar architectures. For example, VLIW instruction widths of 256 bits (4 to 8 times wider than a typical reduced instruction set computer (RISC) instruction) are not uncommon.

The second trend is the use of deep execution pipelines that have become critical in increasing processor clock frequencies. Deep execution pipelines increase the chance of conflicts in read-after-write dependencies. The conflicts are resolved by inserting NOP instructions or by hardware detection techniques that stall the execution pipeline. In either case, valuable execution cycles are lost, which prevents the processor from achieving peak utilization. Software pipelining has become an important tool in eliminating these read-after-write conflicts in deep execution pipelines. Software pipelining works by unrolling a tight loop several times and overlapping multiple iterations of the tight loop to allow more room for the read-after-write dependencies to be resolved without incurring extra NOPs or processor stall cycles. This has the side effect of increasing the tight loop size, thus increasing instruction cache miss rates. Accordingly, there is a need for techniques which reduce or more effectively handle instruction bandwidth.

In the complex instruction set computer (CISC) architecture and reduced instruction set computer (RISC) architecture, there has been little need for instruction compression due to the effectiveness of an instruction cache. However, in U.S. Pat. No. 5,636,352 issued Jun. 3, 1997 for "Method and Apparatus for Utilizing Condensed Instructions", Bealkowski et al. introduce an instruction compression technique. An instruction consists of an opcode (i.e., instruction operand), plus one or more data operands (e.g., source operand field and destination operand field). One or more control bits also are included in the instruction. Bealkowski et al. implement a table, referred to therein as a synonym table, which includes entries for frequently-used instructions. A sequence of instructions is compressed into a single instruction having a previously-undefined special opcode and respective indices into the synonym table (e.g., one per instruction of the sequence being compressed—up to a limit based on the number of bits permitted in the instruction).

A limitation of Bealkowski et al.'s compression technique is that the number of unique instructions in a typical program is quite large. Accordingly, Bealkowski et al. suggest a maximum index width of 12 bits and a synonym table with 4096 entries, each entry holding a 32-bit instruction. Such a table requires 16 kbytes of on-chip memory. This is an expensive solution as the size of such a table is comparable to a first-level instruction cache such as used in high performance processors. Bealkowski et al. suggest one embodiment in which the synonym table is stored in read-only memory, being predetermined at the time of microprocessor design. In another embodiment Bealkowski et al. suggest that the synonym table be loadable during processor initialization. As contemplated, however, the table is of static, unchanging composition. Accordingly, there is a need for a more effective solution for reducing instruction bandwidth.

SUMMARY OF THE INVENTION

According to the invention, instruction bandwidth is reduced by implementing an opcode compression technique. This is distinct from an instruction compression technique in which the entire instruction is compressed. An area of on-chip random access memory is allocated to store one or more tables of commonly-used opcodes. The normal opcode in the instruction is replaced with a code identifying the table and the index into the table. The code includes fewer bits than the uncompressed opcode. As a result, the instruction is compressed.

Although, the technique is implemented for a variety of processor architectures, the technique is particularly advantageous for VLIW instructions which include multiple opcodes, (i.e., one for each subinstruction). In one embodiment a bit among the special code bits of the instruction is allocated to designate whether the VLIW instruction is compressed or not compressed. For example, in some embodiments opcode compression for a VLIW instruction is all or nothing—all subinstruction opcodes are compressed or none. Because adequate methods exist for compressing NOP instruction opcodes, alternative, conventional methods may be used to identify NOP subinstructions among the compressed instruction format of embodiments of this invention.

According to one aspect of this invention, the table of commonly-used opcodes is dynamically updated, overwritten and replaced during real-time processing. A table can be stored during execution of an application program. An advantage of dynamic updating is that a smaller table size can effectively reduce instruction bandwidth. In some embodiments the table need not be dynamic and may be fixed. To store all the most frequently used opcodes for a broad range of application programs, such a table will be larger than a dynamically updated table. For the preferred dynamic implementation the table is customized to the application and becomes part of the program design. For example, different tasks are programmed with a respective table of opcodes to be stored in the opcode table. The respective tables then are loaded in when task switching. A smaller, dynamic opcode table provides the advantage of an effective selection of opcodes and a low overhead for table loading during task switching. Further, when space is allocated on the processor chip to store multiple tables, the table loading overhead is further reduced as one table is made active and another inactive.

In some embodiments, one or more specific entries in a given opcode table are updated. A specific instruction is included in which a table index is used to identify where in the opcode table to overwrite an updated value. Further a CISC-like instruction is included in some embodiments to transfer data from memory into the opcode table faster and to store the table more compactly.

In some embodiments the opcode table is preloaded from non-volatile memory early in a function call. Further, a pointer to the prior table is maintained so that after the function is complete and processing returns to the calling routine, the opcode table for the calling routine is restored.

These and other aspects and advantages of the invention will be better understood by reference to the following detailed description taken in conjunction with the accompanying drawings.

DESCRIPTION OF SPECIFIC EMBODIMENTS

Overview

Figure 1:
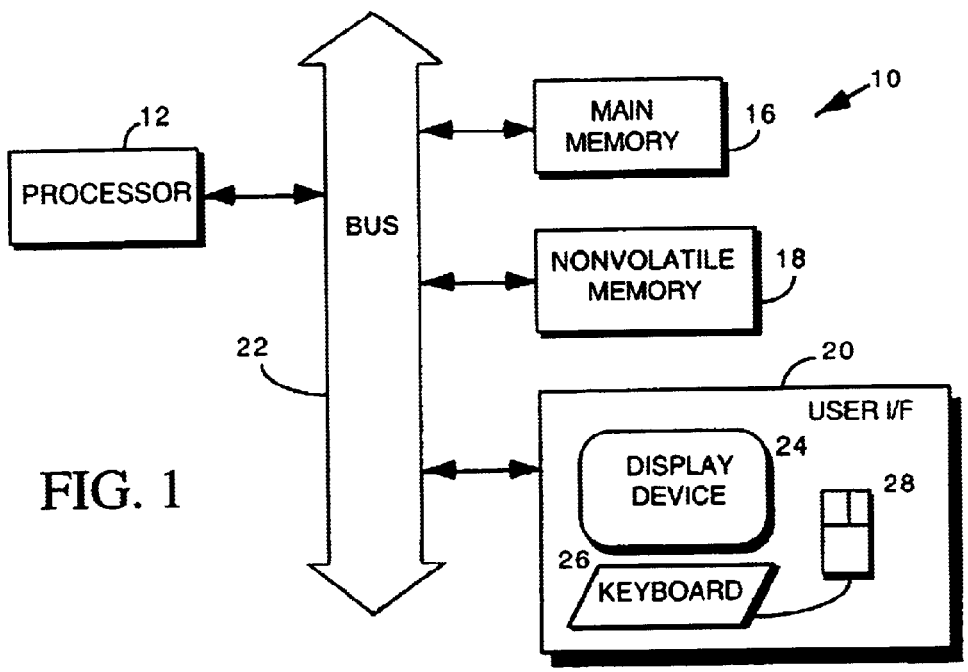
FIG. 1 is a block diagram of an exemplary host processing system.

Referring to FIG. 1, a host system 10 for processing an application program which incorporates one or more opcode compression tables according to an embodiment of this invention includes a processor 12, main memory 16, non-volatile memory 18, and a user interface 20 interconnected by one or more bus structures 22. The user interface 20 includes a display device 24, a keyboard 26 and a pointing/clicking device 28.

The opcode compression techniques of this invention may be implemented on a variety of host processors 12, including very long instruction word ('VLIW') processors and super-scalar processors. Exemplary VLIW processors include the TMS320C6x manufactured by Texas Instruments of Dallas Texas and the MAP1000 manufactured by Hitachi Ltd. of Tokyo Japan and Equator Technologies of Campbell Calif. Each supports a large degree of parallelism of both data streams and instruction streams to implement parallel or pipelined execution of program instructions. Exemplary superscalar processors include the PowerPC 604 manufactured by International Business Machines of New York and the Motorola Corporation of Chicago, Ill.; the Pentium II processor by Intel Corporation of Palo Alto, Calif.; the MIPS R100000; the DEC Alpha 21264 by Digital Equipment Corporation of Maynard, Mass.; the PA-RISC 8000 family of processors manufactured by Hewlett-Packard of Palo Alto, Calif.; and the UltraSPARC-II manufactured by Sun Microsystems of Sunnyvale, Calif.

Figure 2:
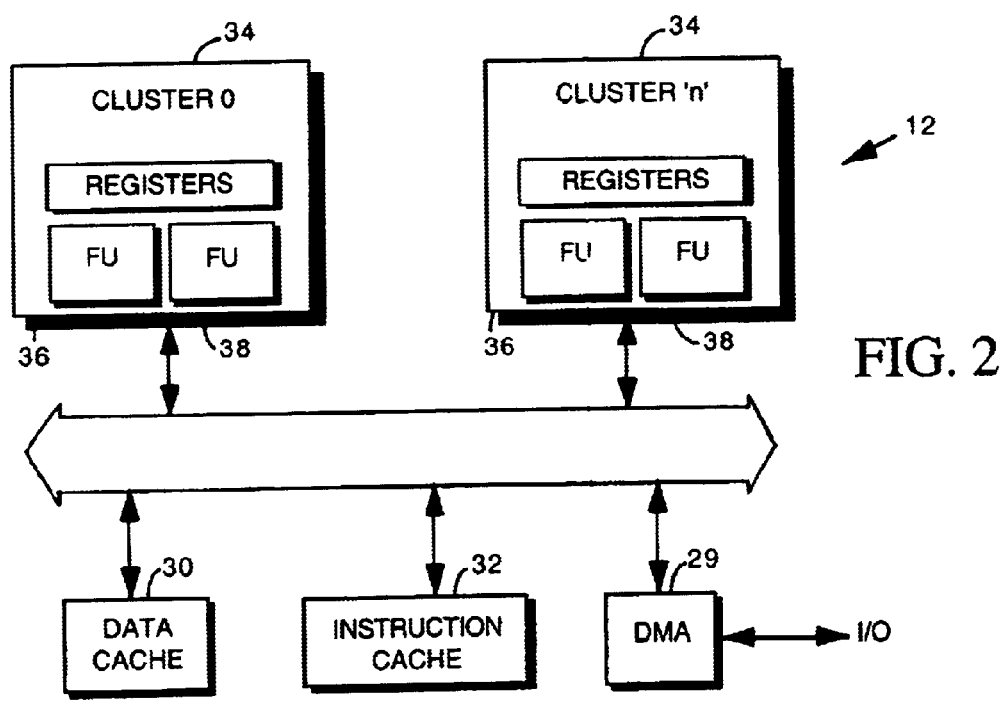
FIG. 2 is a block diagram of an exemplary processor which implements opcode compression according to an embodiment of this invention.

FIG. 2 shows an exemplary processor 12 as implemented on a single chip. Illustrated is the processor architecture of the media accelerated processor 1000 (MAP1000). The MAP1000 processor includes a direct memory access (DMA) controller 29, a data cache 30, an instruction cache 32, and parallel execution units referred to as clusters 34. Each component resides on a common chip. Each cluster 34 includes one or more functional units 36, 38, such as an integer arithmetic and logical unit and an integer floating-point graphic arithmetic and logical unit. Also, each cluster 34 includes several general registers, several 1-bit predicate registers and multiple special purpose registers.

Instruction Formats

Figure 3:
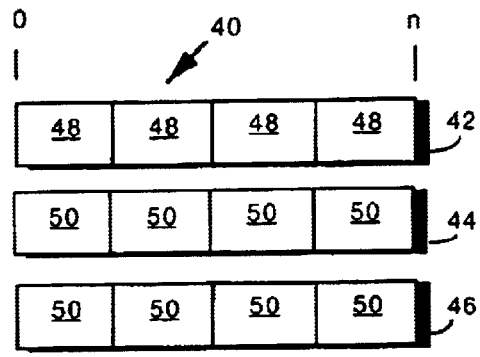
FIG. 3 is a diagram of a conventional uncompressed VLIW instruction format.

Referring to FIG. 3, the conventional, n-bit, uncompressed VLIW instruction 40 format includes an opcode portion 42, one or more source operand fields 44 and a destination operand field 46. The opcode portion 42 is partitioned into a number of opcodes 48 also referred to as subinstruction opcodes. There is one subinstruction opcode for each functional unit 36/38 of each cluster. For example for a VLIW processor 12 having two clusters of two functional units per cluster the instruction 40 includes four subinstruction opcodes 48. The source operand field(s) 44 and destination operand field 46 are similarly partitioned into subwords 50.

Figure 4:
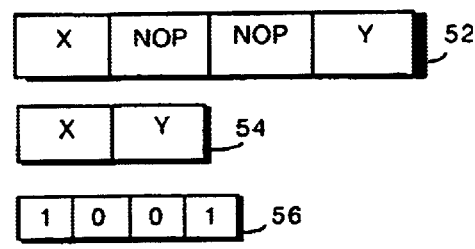
FIG. 4 is a diagram of a VLIW instruction having conventional NOP compression.

Referring to FIG. 4, the opcode portion of a VLIW instruction is shown in uncompressed format 52 and in a format 54 in which NOP subinstruction operands are compressed. According to one conventional method of compressing NOP subinstructions a mask word 56 is created which identifies the placement of the remaining subinstructions, (and conversely the location of the NOP subinstructions).

Figure 5A:
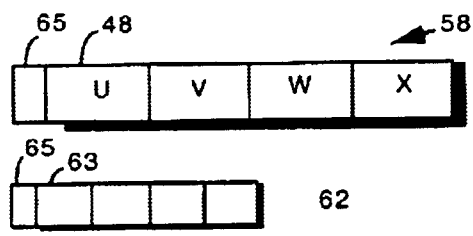
FIGS. 5A and 5B are diagrams of a VLIW instruction exhibiting opcode compression and both opcode compression and NOP compression according to an embodiment of this invention.
Figure 5B:
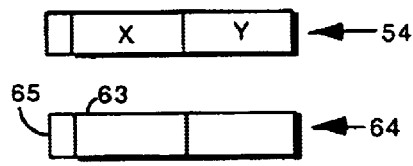

Referring to FIGS. 5A and 5B, the opcode portion of a VLIW instruction is shown in uncompressed format and compressed format for two opcode examples 58, 60. In opcode example 58, there are no NOP subinstructions. In a compressed opcode format 62 the subinstruction operands are compressed to a reduced bit length. Specifically, each subinstruction 48 opcode is replaced with a code 63 which indexes or otherwise points to and/or within an opcode lookup table 66 (see FIG. 6). In opcode example 60 there are NOP subinstructions present. In a preferred embodiment the NOP subinstructions are compressed out using any conventional compression methodology. The remaining subinstruction 48 operands then are compressed to achieve the compressed operand format 64. Again the specific subinstruction opcodes remaining are replaced with a code 63 which indexes or otherwise points to and/or within an opcode look-up table 66 (see FIG. 6).

During normal operation not all VLIW instructions exhibit the opcode compression formats 62/64. For some instructions, the subinstruction opcodes are not compressed, or only the NOP subinstructions are compressed out. In a preferred embodiment for VLIW instructions, however, any VLIW instruction which is to exhibit the opcode compression scheme has all subinstruction opcodes compressed. Note however that the NOP opcodes preferably are compressed in a different manner. Also note that in some embodiments subinstructions sharing further reduces the number of subinstruction opcodes to be compressed.

A compression technique referred to as subinstruction sharing is described in commonly-assigned U.S. patent application Ser. No. 09/5129,695 filed Mar. 7, 2000 of Kim et al., titled "Method and Apparatus for Compressing VLIW Instruction and Sharing Subinstructions." Such application is incorporated herein by reference and made a part hereof. According to such technique, specific cases in which the opcode includes redundant subinstructions are subjected to subinstruction sharing. Specifically, the redundancy is removed so that the redundant subinstruction operand occurs less times (e.g., occurs once) in the compressed subinstruction sharing format. The instruction format for such technique includes a set of control bits in addition to the subinstruction operands. The control bits identify the special case of subinstruction sharing, (e.g., functional unit 1 of every cluster receives a copy of the same subinstruction as stored in a specific subword of the compressed subinstruction sharing opcode.) Several cases of subinstruction sharing are described therein.

To identify whether an instruction's opcode portion 42 is in compressed format or uncompressed format a control bit 65 is used for all opcode formats. The control bit has one value to indicate that compression of subinstruction operands is in effect, and another value to indicate that it is not in effect (although NOP compression and subinstruction sharing may still be in effect).

Figure 7:
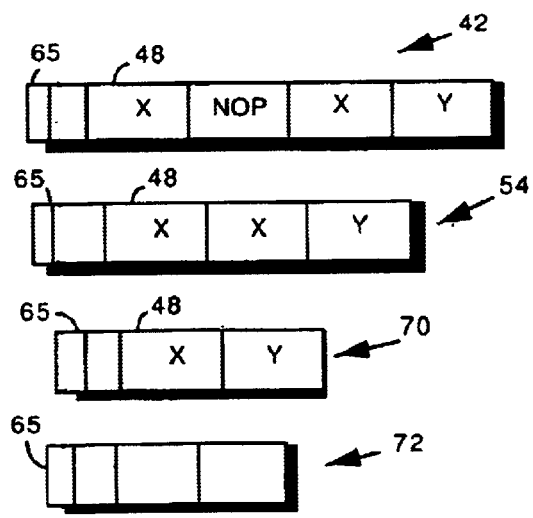
FIG. 7 is a diagram of a VLIW instruction in progressive formats, including uncompressed format, NOP compressed format, subinstruction sharing format and opcode compressed format.

Referring to FIG. 7, the opcode format is shown in uncompressed format 42 and in formats with varying types of compression. Format 54 corresponds to the opcode portion being in NOP compressed format 54. Format 70 corresponds to the opcode portion exhibiting NOP compression and subinstruction sharing. Format 72 corresponds to the opcode portion exhibiting each of NOP compression, subinstruction sharing and opcode compression. During operation, processor 12 may execute instructions in any and all of these formats, individually or accumulated.

Figures 8A, 8B:
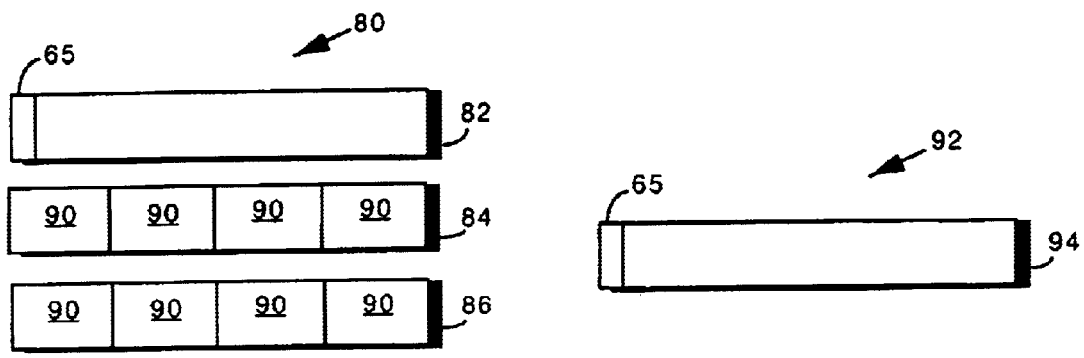
FIGS. 8A and 8B are diagrams of an instruction in uncompressed format and opcode compressed format for a RISC or superscaler processor architecture.

Referring to FIG. 8A, a single instruction format 80 is shown, such as implemented for a processor 12 having a RISC and/or superscalar architecture. The instruction includes an opcode 82, one or more source operand fields 84 and a destination operand field 86. Source and destination op fields are partitioned into subwords 90. As this invention relates to opcode compression without regard to whether compression schemes are implemented or not for the data operands, only the compression of the opcode is described herein. In the compressed opcode format 92 of FIG. 8B, the opcode is compressed to a reduced bit length format. Specifically, the opcode 82 opcode is replaced with a code 94 which indexes or otherwise points to and/or within an opcode lookup table 66 (see FIG. 6). To identify whether an opcode 82 is in compressed format or uncompressed format a control bit 65 is used with the opcode formats 82, 92. The control bit has one value to indicate that compression of subinstruction operands is in effect, and another value to indicate that it is not in effect (although NOP compression and subinstruction sharing may still be in effect).

Opcode Table

Figure 6:
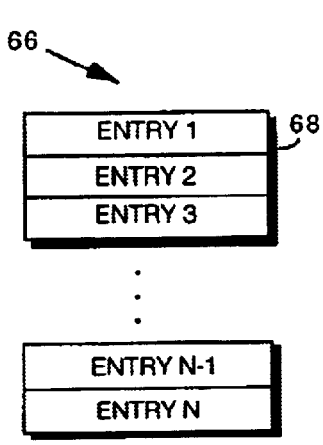
FIG. 6 is a diagram of an opcode table according to an embodiment of this invention.

FIG. 6 shows an opcode look-up table 66 having a plurality of entries 68. Each entry corresponds to a unique opcode. Less than all opcodes for a host processor 12 have an entry in the opcode table 68. In a preferred embodiment, a small, select subset of opcodes are stored in the table 68. In a best mode embodiment the contents of the opcode table 66 are defined during compilation so as to be customized for a given application. In some embodiment, there are a plurality of opcodes which alternatively may be active in on-chip memory to serve as a current opcode table. The opcode table is loaded in for a task during task switching. Accordingly, by keeping the table size small the loading overhead is minimal. Yet by making strategic selection of entries into the table the table is effective for the task.

In a specific embodiment, an opcode table is created during compilation for each function call or task call. When the function becomes active the corresponding opcode table is loaded from system memory (e.g., non-volatile memory 18 or main memory 16) into on chip memory 32, (e.g., on-chip instruction cache memory or on-chip data memory). At such time the prior version of the opcode table may be saved or overwritten. In embodiments where saved, the address is saved. When the function is complete the address of the previous opcode table is retrieved so that the previous opcode table becomes the current opcode table used by the processor 12. Using such a technique the code 63/94 need not include the table address, but only the index into the table. In other embodiments the code may also point to the specific table, where for example embodiments allow multiple opcode tables to be currently active.

In some embodiments various opcode tables are cached on the processor chip. One table is active at a given time as a current opcode table. Such current status changes dynamically during execution of various portions of a program, or for varying programs.

Although the specific opcodes which occur most frequently will depend on the function, task and application program being executed, it has been empirically found that an effective number of opcodes to store in the opcode table for most image processing applications is on the order of 10–20. This is substantially less than the entire operand instruction set of a typical superscalar or VLIW processor. Specifically, in one study by the inventors a 16-entry look-up table was found to be large enough to hold approximately 90% or more of the opcodes used by most image processing functions. In particular, the inventors found that by implementing opcode compression and forming an opcode table, rather than implementing entire instruction compression and an instruction look-up table, the number of entries for effective performance is substantially less.

For a 16 entry table, only 4 bits are needed to define an index into the table 66. In other embodiments however the table size may vary, and accordingly the number of bits which define the code 63/94 also will vary. For a 16 entry table in which each entry (i.e., uncompressed opcode) occupies 12 bits, a total of 192 bits are used for a single opcode table. Accordingly, the table size is small with little overhead during opcode table loading and task switching. This is particularly advantageous for multi-threaded processing where the table is replaced often.

Operation

Figures 9, 10:
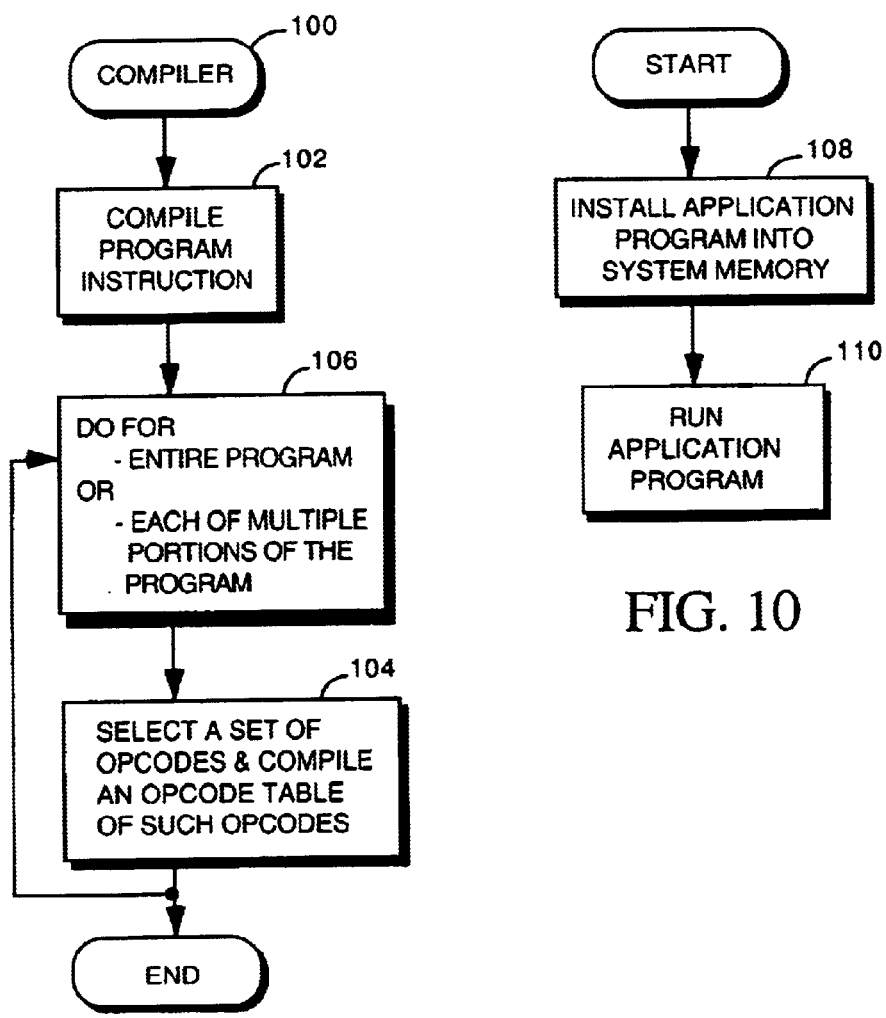
FIG. 9 is a flow chart of a compilation operation which defines one or more opcode tables according to an embodiment of this invention.
FIG. 10 is a flow chart of the installation and running of an application program.

In some embodiments the opcode table is dedicated for a given processor. According to a preferred embodiment, however, the opcode table is defined in software for a given application program. Referring to FIG. 9 a compiler 100 executes a step 102 to compile a listing of source code into machine language for installation into a computer system. During such compilation the compiler executes a step 104 of selecting a set of opcodes to store in an opcode table. Such selection and storage is done either for the entire program or for portions of the program (see step 106). For example, a set of opcodes is selected for every function, task or other modular organization unit of the program. In varying embodiments the number of tables formed may vary according to the method of organization (e.g., by entire program, by function, by other unit). Preferably all opcode tables are same size.

In varying embodiments the strategy used to select which opcodes to store in an opcode table may vary. In a preferred embodiment the most frequently occurring opcodes are selected. Other selection strategies may be implemented.

Referring to FIG. 10, at a step 108 the application program is installed into system memory 19 (see FIG. 12) of a computer system 10 for execution. In other embodiments the application is stored as an embedded computer program on a computing system. At step 110 the application program is run.

Figure 11:
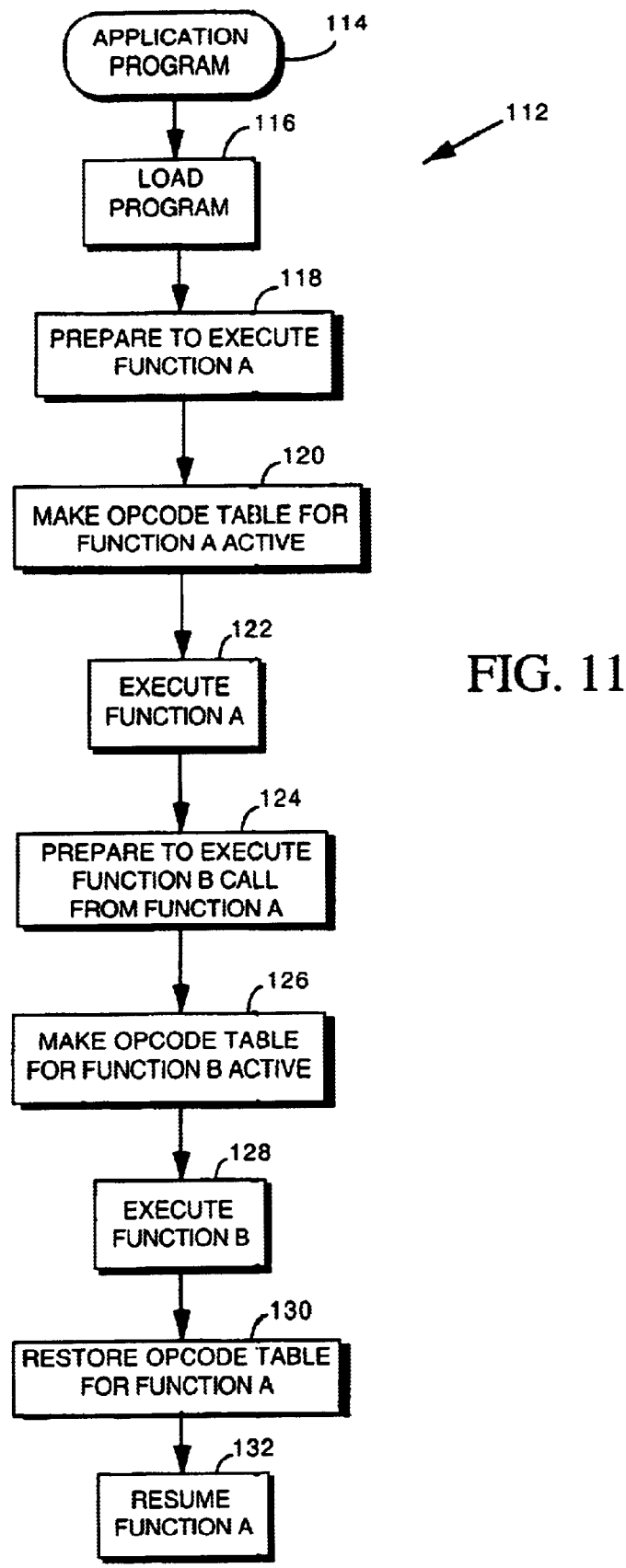
FIG. 11 is a flow chart of the execution of pertinent portions of the application program of FIG. 10 which illustrate an opcode compression implementation according to an embodiment of this invention.
Figure 12:
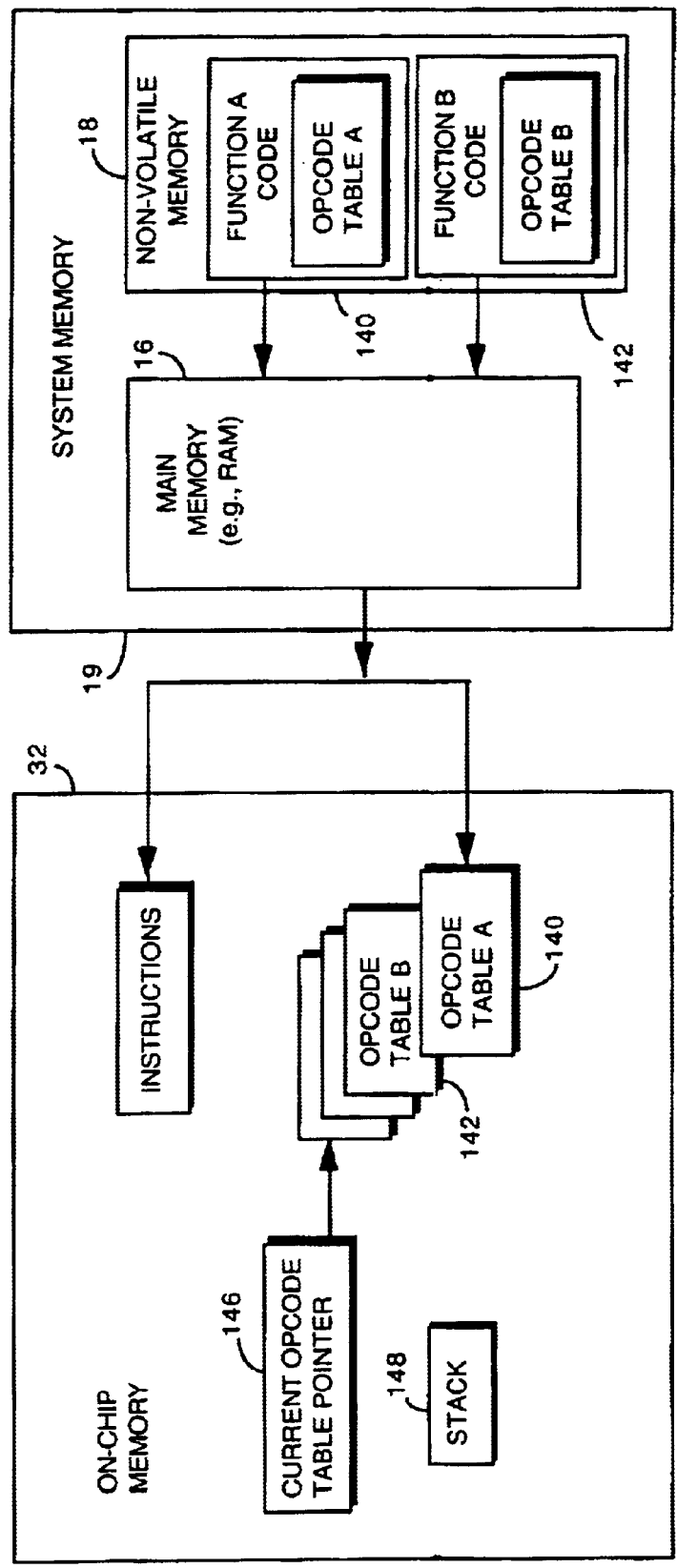
FIG. 12 is a diagram of memory organization for loading of opcode tables according to an embodiment of this invention.

Referring to FIG. 11, a flow chart 112 of the application program 114 operation includes several steps relating to the use of one or more opcode tables 140, 142 (See FIG. 12). At a step 116, the application program is loaded for execution. Such step typically includes loading all or a portion of the application program from non-volatile memory 18 into random access memory, such as main memory 16. Some portion of the program instructions are loaded into on-chip memory 32 of the processor.

During execution of the program the one or more opcode tables 140, 142 defined during compilation are loaded into on-chip memory 32. In some embodiments multiple opcode tables are present in on-chip memory at the same time. In other embodiments, only one opcode table is present on on-chip memory at a given time. In either instance, there is a currently active opcode table at a given time indicated by a pointer 146. When the processor parses an instruction and code 65/94 indicates that opcode compression is active for the instruction, the processor looks to the active opcode table to retrieve the opcode(s) indicated in the compressed instruction format 62/64/72/92.

For example, at step 118 preparation begins for execution of a function A. Included in such preparation is the activation of the opcode table used by function A at step 120. Such activation includes storing the on-chip address of the corresponding opcode table in a current opcode table pointer 146. If the table is not already loaded on-chip, then the step also includes loading the table into on-chip memory. At step 122, function A is further executed. Any instructions which have a code 65 indicating opcode compression is used are parsed by the processor to identify an index into the opcode table. For a VLIW instruction multiple indices may be present. For a RISC or superscalar instruction only one opcode is present. Each index present is used to retrieve an opcode. The opcode then is executed. The source operand and destination operand fields in the instruction, where relevant, are processed based upon the microcode corresponding to the opcode being executed.

In the embodiment where more than one opcode table is defined for an application program, there is a situation where another opcode table is to replace a previous opcode table as the currently active opcode table. For example, at step 124 a function B is to be called for execution. In preparation for execution of function B, the opcode table to be used for function B processing is activated at step 126 to be the current opcode table. Such activation includes storing the on-chip address of the corresponding opcode table in the current opcode table pointer 146. If the table is not already loaded on-chip, then the step also includes loading the table into on-chip memory. At step 128, function B is executed. Upon completion of function B, the previous opcode table is restored as the current opcode table. Such restoration is similar to activating the opcode table for the portion of the program to which control is being returned. In this example, control is being returned to function A. Accordingly, the opcode table for function A is restored as the active opcode table (see step 130).

In one embodiment the address of the opcode table for function A is pushed onto a stack 148 when function B is called. When function B is complete, the address is retrieved from the stack 148 to identify the opcode table address for function A. At step 132 processing of function A resumes.

The table of commonly-used opcodes is dynamically updated, overwritten and replaced during real-time processing. For example, a table is stored during execution of an application program or task and changed for each application program or task. An advantage of dynamic updating is that a smaller table size can effectively reduce instruction bandwidth.

In some embodiments the table need not be dynamic and may be fixed. For example, to store all the most frequently used opcodes for a broad range of application programs, such a table will be larger than a dynamically updated table. For the preferred dynamic implementation the table is customized to the application and becomes part of the program design. For example, different tasks are programmed with a respective table of opcodes to be stored in the opcode table. The respective tables then are loaded in when task switching. A smaller, dynamic opcode table provides the advantage of an effective selection of opcodes and a low overhead for table loading during task switching. Further, when space is allocated on the processor chip to store multiple tables, the table loading overhead is further reduced as one table is made active and another inactive.

In some embodiments, one or more specific entries in a given opcode table are updated. A specific instruction is included in which a table index is used to identify where in the opcode table to overwrite an updated value. Further a CISC-like instruction is included in some embodiments to transfer data from memory into the opcode table faster and to store the table more compactly.

In some embodiments the opcode table is preloaded from non-volatile memory early in a function call. Further, a pointer to the prior table is maintained so that after the function is complete and processing returns to the calling routine, the opcode table for the calling routine is restored.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A processing system for handling a compressed VLIW instruction, the compressed VLIW instruction including an opcode portion having a plurality of indices, each one of the plurality of indices corresponding to a subinstruction opcode, the system comprising:

a processor on a chip and having on-chip memory, the processor for executing an application computer program including a set of VLIW instructions, the application computer program being organized to include a plurality of tasks, the set of VLIW instructions including a call for each respective task of the plurality of tasks, the plurality of tasks including a first task comprised of a first plurality of VLIW instructions and a second task comprised of a second plurality of VLIW instructions, wherein there is a first opcode table compiled for the first task and a second opcode table compiled for the second task, the first opcode table having a plurality of entries, each entry accessed by a unique first index into the first opcode table, each first index corresponding to an uncompressed subinstruction opcode selected during compilation of the application program to improve instruction bandwidth during execution of the first task, each one subinstruction opcode among the entries in the first opcode table occurring no more than one time in the first opcode table, the second opcode table having a plurality of entries, each entry accessed by a unique second index into the second opcode table, each second index corresponding to an uncompressed subinstruction opcode selected during compilation of the application program to improve instruction bandwidth during execution of the second task, each one subinstruction opcode among the entries in the second opcode table occurring no more than one time in the second opcode table;

non-volatile memory in which the application program is stored;

means for loading the first plurality of VLIW instructions and the first opcode table into the on-chip memory for execution of the first task;

wherein the processor reads a first instruction among the plurality of first VLIW instructions during execution of the first task, the processor identifying the first instruction as being compressed, parsing an opcode portion of the first instruction into a plurality of indices, and for each one of the plurality of parsed indices, accessing the loaded first opcode table located in the on-chip memory to retrieve a corresponding subinstruction opcode; and means for loading the second plurality of VLIW instructions and the second opcode table into on-chip memory for executing the second task.

2. The system of claim 1, wherein the first opcode table is a current opcode table accessible by the processor, and further comprising:

means for identifying the second opcode table as being the current table during execution of the second task;

means for restoring the first opcode table to be the current opcode table for continued execution of the first task.

3. The system of claim 2, wherein the first opcode table and the second opcode table concurrently reside in on-chip memory.

4. A method of processing comprising:

compiling an application program to achieve a set of processing instructions and a plurality of opcode tables, wherein the application program is organized to include a plurality of tasks, the set of processing instructions including a call for each respective task of the plurality of tasks, the plurality of tasks including a first task comprised of a first plurality of VLIW instructions and a second task comprised of a second plurality of VLIW instructions, wherein there is a first opcode table compiled for the first task and a second opcode table compiled for the second task, the first opcode table having a plurality of entries, each entry accessed by a unique first index into the first opcode table, each first index corresponding to an uncompressed subinstruction opcode selected during compilation of the application program to improve instruction bandwidth during execution of the first task, each one subinstruction opcode among the entries in the first opcode table occurring no more than one time in the first opcode table, wherein there is a unique index into the first opcode table for each one of the first plurality of uncompressed subinstruction opcodes, the second opcode table having a plurality of entries, each entry accessed by a unique second index into the second opcode table, each second index corresponding to an uncompressed subinstruction opcode selected during compilation of the application program to improve instruction bandwidth during execution of the second task, each one subinstruction opcode among the entries in the second opcode table occurring no more than one time in the second opcode table, wherein there is a unique index into the second opcode table for each one of the second plurality of uncompressed opcodes;

storing the application program in a first memory of a computer system;

loading the first plurality of VLIW instructions and the first opcode table into on-chip memory of a processor in the computer system;

reading a first instruction of the first plurality of VLIW instructions from the on-chip memory;

identifying the first instruction as being a compressed VLIW instruction;

parsing the compressed instruction to identify a plurality of indices into the first opcode table, each index among the plurality of indices for identifying a corresponding subinstruction opcode within the first opcode table;

retrieving from on-chip memory each corresponding subinstruction opcode from the loaded first opcode table based on the identified plurality of indices;

executing the retrieved subinstruction opcodes by the processor as subinstructions of the first instruction;

loading the second plurality of VLIW instructions and the second opcode table into on-chip memory; and executing the second task.

5. The method of claim 4, further comprising the steps of:

reading from on-chip memory a second instruction of the second plurality of VLIW instructions;

identifying the second instruction as being compressed;

parsing the second instruction to identify a plurality of indices into the second opcode table, each index among the plurality of indices for identifying a corresponding subinstruction opcode within the second opcode table;

retrieving each corresponding subinstruction opcode from the second opcode table based on the identified plurality of indices;

executing the subinstruction opcodes by the processor as subinstructions of the second instruction; and upon completed execution of the second task, restoring the first opcode table as the current opcode table.

6. The method of claim 5 in which the step of loading the second opcode table comprises: loading the second opcode table into the on-chip memory so that the first opcode table and the second opcode table concurrently reside in on-chip memory.

7. The method of claim 4, wherein the step of compiling comprises:
   selecting a set of subinstruction opcodes to store in the first opcode table for use while executing the first task; and
   selecting another set of subinstruction opcodes to store in the second opcode table for use while executing the second task.

8. The method of claim 4, in which the step of compiling comprises:
   identifying a first set of subinstruction opcodes for improving instruction bandwidth during execution of the first task;
   storing the first set of subinstruction opcodes in the first opcode table, wherein each subinstruction opcode among the first set of subinstruction opcodes occurs no more than once in the first opcode table;
   identifying a second set of subinstruction opcodes for improving instruction bandwidth during execution of the second task; and
   storing the second set of subinstruction opcodes in the second opcode table, wherein each subinstruction opcode among the second set of subinstruction opcodes occurs no more than once in the second opcode table.

9. A processing system for handling a compressed VLIW instruction, the compressed VLIW instruction including an opcode portion having a plurality of indices, each one of the plurality of indices corresponding to a subinstruction opcode, the system comprising:
   a processor on a chip and having on-chip memory, the processor for executing a plurality of application programs, wherein there is a plurality of VLIW instructions and at least one opcode table associated with each application program, wherein the at least one opcode table comprises a plurality of entries, each entry of a given opcode table among the at least on opcode table accessed by a unique first index into the given opcode table, each first index corresponding to an uncompressed subinstruction opcode selected during compilation of the associated application program, each one subinstruction opcode among the plurality of uncompressed subinstruction opcodes occurring no more than one time in the given one opcode table of the at least one opcode table, wherein there is a unique index into the given one opcode table for each one of the first plurality of uncompressed subinstruction opcodes, wherein the selection of subinstruction opcodes for each one opcode table of said at least one opcode table is performed for each application program to improve instruction execution bandwidth during execution of the associated application program or a portion thereof;
   non-volatile memory in which the plurality of application programs are stored;
   means for loading a first plurality of VLIW instructions and a first opcode table associated with a first application program into the on-chip memory;
   wherein the processor reads a first instruction among the first plurality of VLIW instructions during execution of the first application program, the processor identifying the first instruction as being compressed, parsing an opcode portion of the first instruction into a plurality of indices, and for each one of the plurality of parsed indices, accessing a corresponding subinstruction opcode from the loaded first opcode table located in the on-chip memory; and
   means for loading a second plurality of VLIW instructions and a second opcode table into on-chip memory for execution of a second application program.

10. The processing system of claim 9, further comprising:
    means for identifying the second opcode table as being the current table during execution of the second application program; and
    means for restoring the first opcode table to be the current opcode table for continued execution of the first application program.

11. The processing system of claim 9, in which the first application program is organized into a plurality of tasks, each one task having an associated call instruction to execute said one task, the system further comprising:
    means for dynamically modifying an entry in the first opcode table to redefine the first opcode table during switching among any one of the plurality of tasks to a current task and prior to execution of the current task to reduce instruction bandwidth for the current task of the plurality of tasks.

* * * * *